US008358797B2

(12) United States Patent
Fretz

(10) Patent No.: US 8,358,797 B2
(45) Date of Patent: Jan. 22, 2013

(54) SWITCH FOR A HEARING AID

(75) Inventor: Robert J. Fretz, Maplewood, MN (US)

(73) Assignee: Intricon Corporation, Arden Hills, MN (US)

( * ) Notice: Subject to any disclaimer, the term of this patent is extended or adjusted under 35 U.S.C. 154(b) by 649 days.

(21) Appl. No.: 12/539,702

(22) Filed: Aug. 12, 2009

(65) Prior Publication Data

US 2010/0040239 A1 Feb. 18, 2010

Related U.S. Application Data

(60) Provisional application No. 61/088,033, filed on Aug. 12, 2008.

(51) Int. Cl.
*H04R 25/00* (2006.01)
*H04B 15/00* (2006.01)

(52) U.S. Cl. ............. 381/318; 381/83; 381/93; 381/123

(58) Field of Classification Search .................... 381/83, 381/93, 312, 316–318, 320, 321, 81, 121, 381/122, 123, 58, 59, 60
See application file for complete search history.

(56) References Cited

U.S. PATENT DOCUMENTS 3,970,987 A 7/1976 Kolm
5,493,618 A 2/1996 Stevens et al.
5,615,271 A 3/1997 Stevens et al.
6,173,063 B1 * 1/2001 Melanson ..................... 381/318
6,434,247 B1 * 8/2002 Kates et al. ................... 381/312
6,498,858 B2 * 12/2002 Kates ............................ 381/318
6,748,089 B1 6/2004 Harris et al.
7,013,015 B2 * 3/2006 Hohmann et al. ............ 381/318
7,197,152 B2 * 3/2007 Miller et al. .................. 381/326
7,519,193 B2 * 4/2009 Fretz ............................. 381/312
7,639,827 B2 12/2009 Bachler
7,809,150 B2 * 10/2010 Natarajan et al. ............. 381/318
8,116,473 B2 * 2/2012 Salvetti et al. ............. 381/71.11
8,199,948 B2 * 6/2012 Theverapperuma .......... 381/318
2002/0067838 A1 6/2002 Kindred et al.
2004/0125966 A1 * 7/2004 Weidner .......................... 381/96
2005/0078842 A1 4/2005 Vonlanthen et al.
2007/0248237 A1 10/2007 Bren et al.
2008/0123885 A1 5/2008 Weidner
2011/0142269 A1 * 6/2011 Fretz ............................. 381/314

OTHER PUBLICATIONS

PCT Search Report, Mar. 15, 2010.
PCT Written Opinion, Mar. 12, 2010.

* cited by examiner

*Primary Examiner* — Xu Mei
(74) *Attorney, Agent, or Firm* — Westman, Champlin & Kelly, P.A.; Z. Peter Sawicki

(57) ABSTRACT

A method of changing at least two parameter settings of a device includes detecting an abnormal change in an external feedback path and an input signal generated by an abnormal pressure wave, and activating a pressure wave detection switch and an abnormal feedback path detection switch for changing the at least one parameter setting in the device. A device includes a digital signal processor configured to implement a detection algorithm to detect an abnormal change in an external feedback path, an adaptive internal feedback cancellation system for continually monitoring and responsively adapting to changes occurring in an external feedback path, a pattern recognition algorithm for detecting input signals generated when an abnormal pressure wave is generated, at least two parameter settings for adjusting the characteristics of the device, and an abnormal feedback path detection switch for switching the device to a next available parameter setting.

9 Claims, 8 Drawing Sheets

SWITCH FOR A HEARING AID

CROSS-REFERENCE TO RELATED APPLICATION

The present application is based on and claims the benefit of U.S. provisional patent application Ser. No. 61/088,033, filed Aug. 12, 2008, the content of which is hereby incorporated by reference in its entirety.

BACKGROUND

A user can change the parameters of a hearing aid through the use of a push button to optimize the hearing aid for a variety of listening situations. The parameters, also known as programs, optimize the hearing aid for different types of listening situations. For instance, a first parameter set may be set up for normal listening situations, a second parameter set may be set up for listening in noisy environments, whereas a third parameter set may be set up for use with a telephone. Examples of the parameters that could be included in the parameter set are the volume setting, the frequency response shaping, and the compression characteristics. To cycle through the parameters, a user usually uses his or her finger to push the button.

The push button is a small actuable device located either on the body or the faceplate of the hearing aid. While hearing aids with more than one push button exist, often only a single button is provided. With each push of the push button, the hearing aid can advance to a different parameter set that is most appropriate for the user's listening situation.

Due to the small size of the push button, the user may not always realize that the button has been pushed. To clearly indicate to the user that the push button has been activated, most hearing aids generate an audible tone. Despite the generated tone, however, most users still have a hard time locating the push button on the hearing aid because the push button is relatively small compared to a regular user's fingers. This drawback makes hearing aids with a push button hard to operate, especially for elderly users.

Additionally, push buttons located on the body or the faceplate of a hearing aid are susceptible to sweat and debris that are likely to cause the hearing aid to fail. Also, while the push button may be small relative to a user's finger tips, it still adds to the size of the hearing aid, thus making the hearing aid more visible and unattractive.

SUMMARY OF THE DISCLOSURE

A device includes at least one microphone for receiving an input sound, a digital signal processor connected to the microphone for producing a digital processor output signal, the digital signal processor configured to implement a detection algorithm to detect an abnormal change in an external feedback path, a speaker for converting the digital processor output signal into output sound, an adaptive internal feedback cancellation system for continually monitoring and responsively adapting to the abnormal change occurring in the external feedback path, at least two parameter settings for adjusting characteristics of the device, and an abnormal feedback path detection switch for switching the device to a next available parameter setting in response to output from the detection algorithm.

A device comprises at least one microphone for receiving an input signal, a digital signal processor connected to the microphone for analyzing the input signal, at least two parameter settings for controlling the characteristics of the device, a pattern recognition algorithm implemented by the digital signal processor for detecting at least one input signal produced when an abnormal f pressure wave is generated, and a pressure wave detection switching system for changing the at least two parameter settings in response to output from the pattern recognition algorithm.

A method of changing at least two parameter settings of a device that comprises detecting, using a digital signal processor, an abnormal change in an external feedback path, detecting, with the digital signal processor, an input signal generated by an abnormal pressure wave, and activating, with the digital signal processor, a pressure wave detection switch and an abnormal feedback path detection switch for changing the at least one parameter setting in the device.

DETAILED DESCRIPTION OF ILLUSTRATIVE EMBODIMENTS

A user can change at least one parameter setting of a device when an abnormal change is generated, the abnormal change being an external feedback path or when an input signal is generated by an abnormal acoustic pressure. This change is brought about by the user bringing his or her hand near or touching the device.

Figure 1:
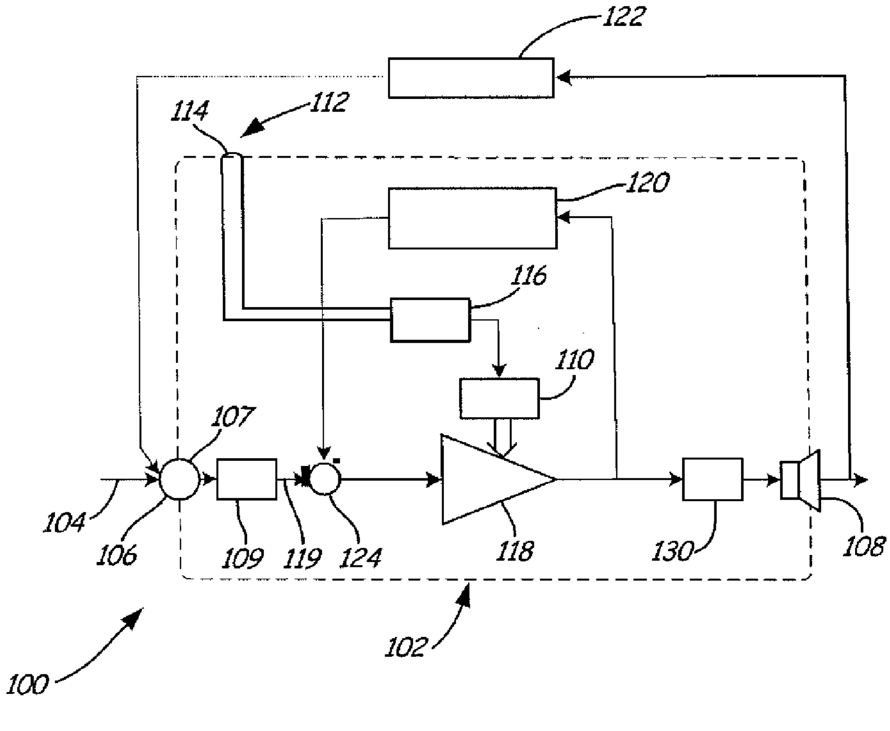
FIG 1 RELATED ART
FIG. 1 illustrates a related art block diagram of a hearing aid device with a physical push button.

FIG. 1 illustrates a schematic block diagram of a related art hearing aid device 100. The hearing aid device 100 includes a digital processor 102 which receives an input signal 104 from the environment. This acoustical input is converted to an electrical signal by microphone 106. An A/D converter 109 converts the input to digital signal 119. The digital amplifier 118 amplifies the signal and provides the through the digital to analog converter 130 to a speaker 108. The digital processor 102 has parameter settings 110, also known as programs, which assist a hearing aid user in adapting to different types of listening environments.

The parameter settings 110 can be adjusted according to the type of listening environment a user may be in. To change from one parameter setting to another parameter setting in the hearing aid device 100, the user can press a physical push button 112 located either on the body or on the faceplate of the hearing aid 100. The physical push button 112 operates by closing a contact 114 sensed by a push-button detection algorithm 116 which then responsively switches the device to the next available parameter setting 110.

Although the number of parameter settings 110 available in hearing aid devices varies, the typical hearing aid device can have three parameter settings. For example, there may be one parameter setting for normal listening situations, one for noisy environments, and one parameter setting to facilitate the user's hearing during a telephone conversation. Usually, with each push of the physical push button 112, the hearing aid device 100 changes settings to the next parameter setting 110. After a user reaches the last available parameter setting 10, the next push of the physical push button 112 resets the hearing aid device 100 back to the first parameter setting 110.

The digital processor 102 employs a digital amplifier 118, which utilizes a feedback cancellation function to adapt an internal filter 120 to match an external acoustic feedback path 122. The digital processor 102 also employs a summation algorithm 124 for subtracting the internal filter 120 from the microphone output signal 107 to cancel the effect of the acoustic feedback path 122. The internal filter 120 is usually a finite impulse response filter, which adapts its response to match the changes occurring in the acoustic feedback path 122.

Although others have attempted to overcome the problems associated with the push button, they fail to create a push button that is both discrete and resistant to false parameter switches. For example, one system deals with a voice activated switching system where a user speaks a command that the hearing aid device will recognize and, in response to the command, change the parameters of the device. However, because the voice activated switching system uses a voice detection algorithm that is difficult to implement, the system is prone to erroneous parameter switches. In addition, the voice activated switching system is likely to draw unwanted attention to the user because it requires the user to speak a command that is equal to or above the environmental sound level.

Another example of a system which has not been able to fully overcome the problems associated with the push button uses a reduction in an input level as a switching means. The reduction in the input level occurs when a user covers the microphone port of the hearing aid device to attenuate the input signal. However, since the normal acoustic input to hearing aid devices has a large dynamic range, the effect of the input signal's normal drop in level could be the same as when the user is attenuating the input signal, and thus would generate false parameter switches.

While the hearing aid 100 shown in FIG. 1 has become the standard for many applications, it remains difficult for users to change from one parameter setting to another, in part because the physical push button is small in comparison to the regular adult user's finger and complicates the process of switching between parameter settings. Also, the physical push button is unattractive because it adds to the size of the hearing aid device.

Figure 2:
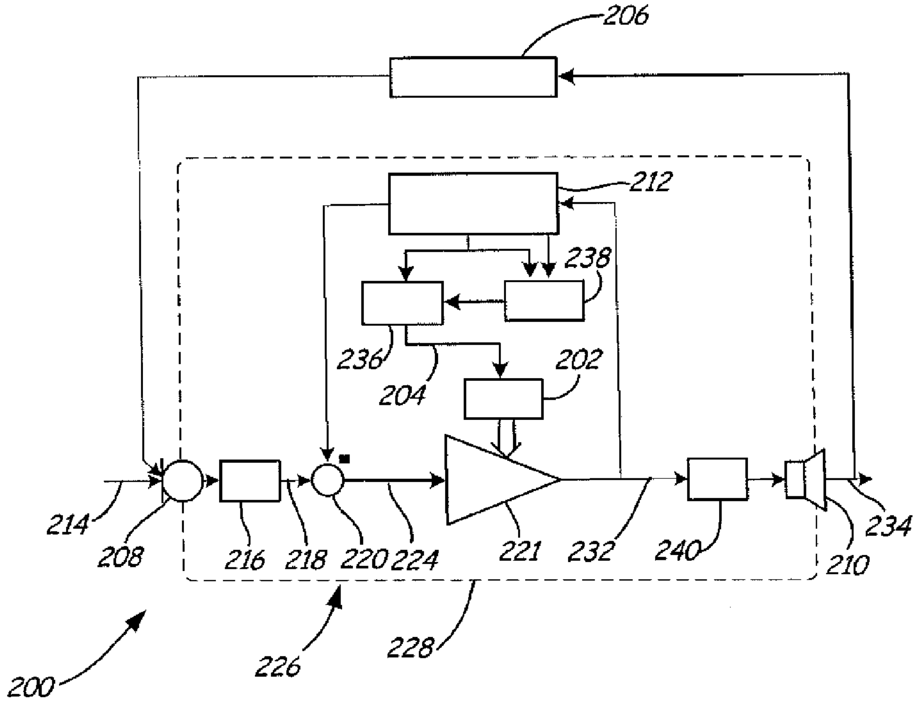
FIG. 2 illustrates a schematic block diagram a device that changes parameter settings by using an abnormal feedback path detection switch.

FIG. 2 illustrates a schematic diagram of a device 200 of this disclosure. It should be realized that device 200 can be any type of acoustic device, such as a hearing aid, a wireless earpiece, or a combination of an ear protection device coupled with a hearing feed through. Under one embodiment, the device 200 changes at least one parameter setting 202 upon activation of an abnormal feedback path detection switch 236. A change in a parameter setting 202 adjusts a characteristic of the device 200, such as volume control or other, more sophisticated characteristics. The device 200 conforms to different types of listening environments by detecting an abnormal change in an external feedback path 206. The external feedback path 206 is the path between a microphone 208 and a speaker 210 located external to the digital signal processor 226. Abnormal change in the external feedback path 206 is a change which the user causes but is not caused by other conditions. The device 200 may be implemented in all hearing aid device designs that have a feedback path that can be tracked with a feedback cancellation system.

The switching chain of events would be as follows: First the user brings his hand near the device thus significantly altering the external feedback path 206. Next the internal feedback path 212 also changes significantly as it tracks the external path change. Next the FIR level detection algorithm 236 detects this internal change and activates switch signal 204. Lastly, the switch signal 204 causes the parameter setting algorithm 202 to activate a new parameter set. The significantly altered external feedback path reaches an abnormal condition when it activates the switch. One measure of abnormal may be simply that the magnitude of the feedback path is greater than about twice the normal condition. More sophisticated measures of abnormal, such as measuring the detailed shape of the feedback path may also be used. A measure of the normal condition of the feedback path is determined by the averaging algorithm 238. This serves as a reference for determining when the internal feedback path 212 has reached the abnormal level. Details of the algorithm blocks are described below.

As shown in FIG. 2, the device 200 includes at least one microphone 208 for receiving an input sound 214 and an analog-to-digital converter 216 for converting the input sound 214 into an input signal 218. A node 220 operates to subtract a feedback cancellation signal 222 from the input signal 218 and generate a digital processor input signal 224. Although the node 220 and the internal feedback filter 212 are disclosed in the exemplary embodiment, those skilled in the art will recognize that a variety of methods can be used to form an internal estimate of the external feedback path. By amplifying the digital processor input signal 224, a digital amplifier 221 produces a digital processor output signal 232. The digital signal 232 is converted to an analog signal by the A/D converter 240. A speaker 210, also known in the art as a receiver, then converts the analog signal into output sound 234. The digital processor 226 is located inside the device 200 and comprises a housing 228

An adaptive internal feedback cancellation filter 212 continuously monitors changes that occur in the external acoustic feedback path 206. The adaptive internal feedback cancellation filter 212 monitors changes that occur in the external acoustic feedback path 206, and responsively adapts to match the external acoustic feedback path 206. The adaptive internal feedback cancellation filter 212 may be a finite impulse response (FIR) filter or another type of filter. When the finite impulse response (FIR) filter is employed, the coefficients of the filter are the means by which the internal feedback path 212 is adapted to match the external acoustic feedback path 206.

After the current filter coefficients have been altered to respond to the increase in the external acoustic feedback path 206, a detection algorithm 236, implemented by the digital signal processor 226, ascertains whether an abnormal change in the external feedback path 206 has occurred. It should be realized by those skilled in the art that besides the use of a detection algorithm 236, in other embodiments digital signal processor 226 can implement firmware or code embedded in the digital signal processor. The detection algorithm 236 detects that the abnormal change in the external feedback path 206 has occurred by comparing the current filter coefficients to the normal filter coefficients. If the current filter coefficients differ from the normal filter coefficients by a threshold, then the abnormal feedback activated switch 204 is activated and operates to switch the device 200 to the next available parameter setting 202. In one embodiment, the current and the normal coefficient difference is measured by calculating the magnitude of the two sets of coefficients and forming the ratio of the current to the normal. This ratio is then compared to a threshold to determine if the current coefficients are abnormal. While the lowest threshold may be set at 2, the preferred threshold level for the ratio is 3.

Figure 3:
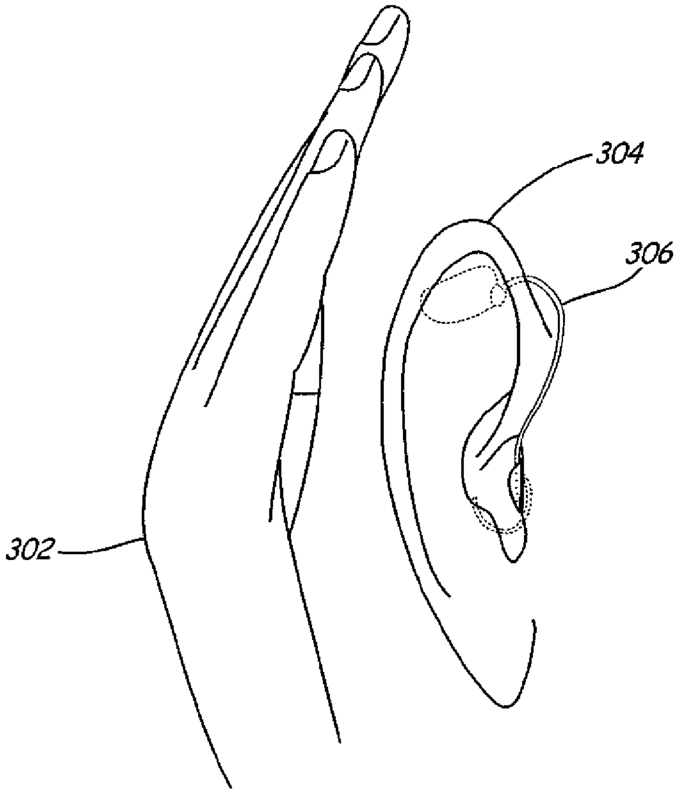
FIG. 3 illustrates a user activating an abnormal feedback path detection switch by cupping the user's hand over the device.

The abnormal feedback path detection switch can be activated in a variety of ways. In FIG. 3, for example, the user can activate the abnormal feedback path detection switch when the user cups his hand 302 over the device 306 and the ear 304. The device 306 shown is FIG. 3 is a BTE (Behind-the-Ear) hearing aid style. With this style, the user can cup his hand over both the ear canal and the device microphone port so that a very strong and abnormal feedback path is developed. For ITE (In-the-Ear) style devices, the user's hand covering the ear can be sufficient to cause an abnormal feedback path.

Figure 4:
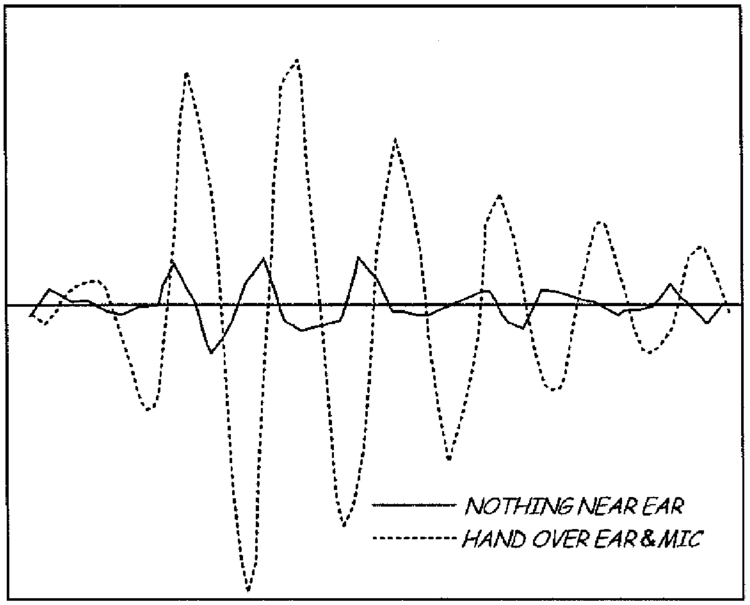
FIG. 4 illustrates an exemplary graph that represents the response of FIR filter coefficients.

FIG. 4 is an exemplary graph representing the responses of the FIR filter coefficients of algorithm block 212 when there is no abnormal activity occurring near the user's ear or the device and when the user's hand is used to cup the user's ear or the device. When abnormal activity is generated near the user's ear or the device, the internal acoustic feedback path drastically increases. The increase in the internal acoustic feedback path is reflected in the current filter coefficients. As denoted in FIG. 4, the solid line illustrates the FIR filter coefficients' response when there is no abnormal activity occurring near the user's ear or the device. By contrast, the dotted line shown in FIG. 4 denotes the FIR filter coefficients' response when the user either cups the user's ear or the device. The hand over the ear condition clearly causes coefficient magnitudes far greater than the normal condition, thus creating the delectability of abnormal activity near the user's ear or the device. While FIG. 4 displays the behavior of the FIR filter coefficients at a sampling rate of 16 kHz, those skilled in the art will recognize that the sampling rate at which the behavior of the FIR filter coefficients is tracked can vary.

The normal filter coefficients, determined in the algorithm 238, can be ascertained in a variety of ways. One way to determine the normal filter coefficients includes averaging the coefficients at a slow rate, where slow rate is defined as a rate slower than seconds. Preferably, the rate is in the one minute to two minutes range. Alternatively, the normal filter coefficients can be determined after the control adaptation function deems the coefficients stable and then computes the average. The coefficients will be deemed stable when the device is in a normal listening environment which occurs when there is only ordinary activity occurring near the user's ear or the device. Another way of determining the normal filter coefficients is to calculate the average during the fitting process when the device is being set up. At this time, the device is stable and in a normal listening environment. Yet another way to ascertain the normal filter coefficients is to quickly adjust the average of the normal filter coefficients when the device is turned on for the first time.

Figure 5:
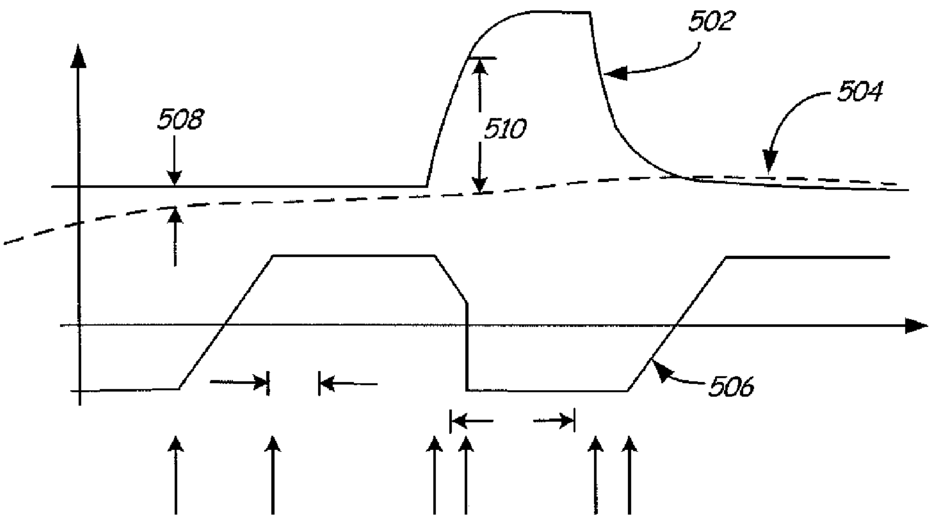
FIG. 5 illustrates an exemplary timing diagram utilized by a detection circuit.

FIG. 5 illustrates an exemplary timing diagram utilized by the detection circuit 236 for the device shown in FIG. 2. The detection circuit detects whether there has been a change in the external feedback path. To detect the change, the detection circuit follows a logical timing sequence comprising logical timing steps to determine when to indicate the abnormal feedback path detection switch. The process described in FIG. 5 is one logical process of determining when the appropriate time is to indicate the abnormal feedback path detection switch, and it should be noted that other logical processes may be implemented by the detection circuit.

The first logical step occurs when a Ready signal is activated. The Ready signal tracks when the power in the current filter coefficients is near the power in the normal filter coefficients. The power in the current filter coefficients is denoted by Pcur, and it is calculated as shown in Equation 1:

$$P\text{cur}=\Sigma C^2(n) \qquad \text{Equation 1}$$

where C(n) denotes the $n^{th}$ current filter coefficient.

The power in the normal filter coefficients is denoted by Pnorm, and it is calculated as shown in Equation 2:

$$P\text{norm}=\Sigma D^2(n) \text{ with slow averaging} \qquad \text{Equation 2}$$

where D(n) denotes the $n^{th}$ normal filter coefficient.

Referring to FIG. 5, Pcur 502 is near Pnorm 504 when nothing is near the user's ear or the device. At point A, when Pcur and Pnorm reach a small difference Diff1, the Ready signal 506 is allowed to increase to a value greater than zero. As shown at point A in FIG. 7, Diff1 is typically about 10 to 50 percent of the value of Pnorm. Once the Ready signal crosses through zero and Diff1 either remains the same or becomes even smaller, then the Ready signal reaches a maximum, as shown at point B.

Under normal operating conditions, the value of the Ready signal stays at the maximum. However, when the user moves the user's hand close to the user's ear or the device, point C, the internal coefficients increase as described above and Pcur increases significantly. At this point, Pcur and Pnorm no longer differ by less than Diff1. Because the difference between Pcur and Pnorm is greater than Diff1, the Ready signal begins to decrease. If the difference between Pcur and Pnorm exceeds Diff2 510, where Diff2 is about three times the value of Pnorm, and if the Ready signal is still above zero, the acoustic feedback-activated switch is activated, point D.

After the acoustic feedback-activated switch has occurred, a signal 204 is sent to a Program Settings circuit 202 which then selects the next available program. An audible signal, such as a beep tone, can be sent out to the speaker to inform the user of the parameter setting change. At this point, the Ready signal is reset to a value below zero to prevent a second, erroneous switch. The Ready signal remains to a value below zero as long as the object is near the user's ear or the device, which ensures that the difference between Pcur and Pnorm is greater than Diff1. When the object is no longer near the user's ear or the device, the difference between Pcur and Pnorm will decrease to a value below Diff1. At this point, point F of FIG. 5, the Ready signal will once again begin to increase to a point above zero and stabilize to the maximum, thus allowing the process of switching programs on the device to restart.

Figure 6:
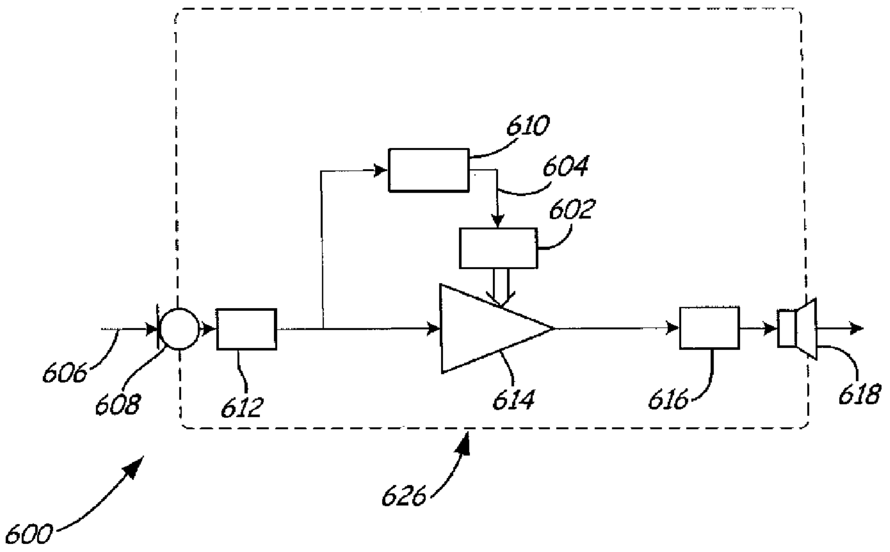
FIG. 6 illustrates a schematic block diagram of a device that changes parameter settings by detecting an input signal generated by an abnormal pressure wave.

FIG. 6 illustrates a schematic diagram of a device 600. It should be realized that device 600 can be any type of acoustic device, such as a hearing aid, a wireless earpiece, or a combination of an ear protection device coupled with a hearing feed through. Under one embodiment, the device 600 changes at least one parameter setting 602 by detecting an input signal generated by an abnormal pressure and, in response, activating a pressure wave detection switch 604 for changing at least one parameter setting 602 of the device 600. A change in a parameter setting 602 adjusts a characteristic of the device 600, such as volume control, frequency response or other, more sophisticated characteristics. A pressure wave is defined as a large amplitude acoustic input signal. An abnormal pressure wave is defined as the particular large acoustic signal that is generated by the user's hand patting the ear or touching the device.

The position of the device microphone 608 may vary as long as a large microphone output can be generated by the user's hand. Although device 600 may be implemented in all hearing aid device designs, optimally, device 600 could be implemented with an "in-the-ear"-type hearing aid device. The "in-the-ear"-type hearing aid device design allows for the creation of an input signal that has high amplitude and a unique pattern because the microphone is located in the user's ear canal and a large signal is generated when the user pats his ear canal. For "behind-the-ear" devices, the pressure wave could be generated by the user touching the microphone port of the device.

As shown in FIG. 6, the device comprises at least one microphone 608 for receiving an input signal 606. The device further comprises a digital signal processor 626 connected to the microphone 608 for analyzing the input signal 606. In this embodiment, the signal from the microphone is converted to a digital signal by the A/D converter 612. To control the characteristics of the device 600, at least two parameter settings 602 are employed in the digital signal processor 626. A pattern recognition algorithm 610 is implemented by the digital signal processor 626 to detect the input signal 606 which is produced when an abnormal pressure wave is generated. It should be realized by those skilled in the art that besides the use of a recognition algorithm 610, in other embodiments digital signal processor 626 can implement firmware or code embedded in the digital signal processor. A pressure wave detection switching system is employed for switching between at least two parameter settings in response to output from the pattern recognition algorithm. In FIG. 6, the processor 626 is a hearing aid. It includes a digital amplifier 614, D/A converter 616 and a speaker 618. Note that the device may have a feedback cancellation algorithm but that function is not necessary for the pressure switching algorithm.

Figure 7:
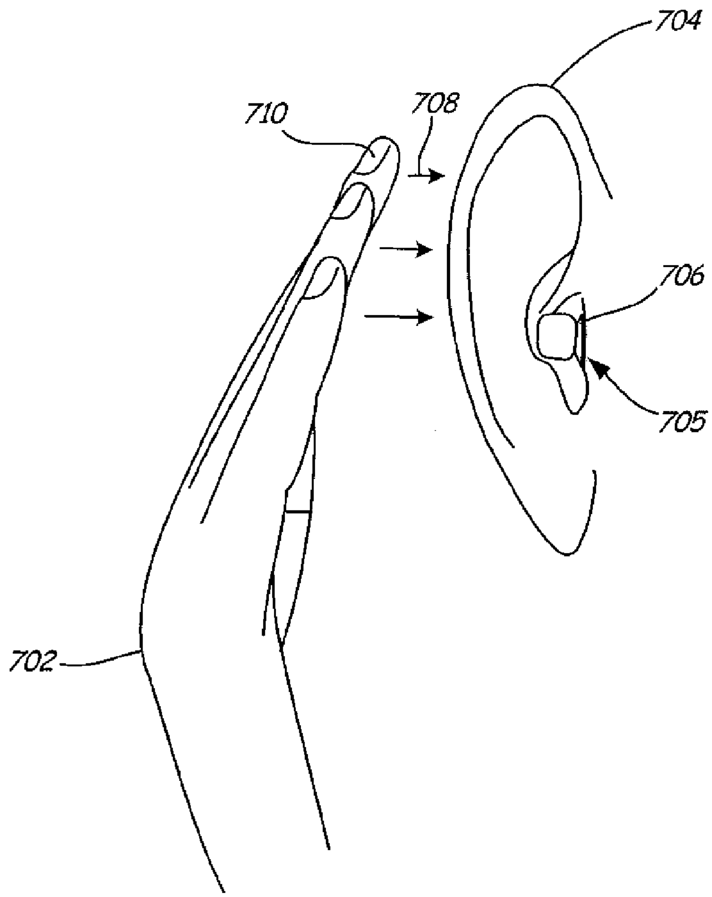
FIG. 7 illustrates a user activating a pressure wave detection switch by using the user's hand to pat the user's car.

The pressure wave detection switch 604 is activated by a particular, high level signal, which may be generated in a variety of ways. As illustrated in FIG. 7, for example, the input signal may be generated when the user uses the user's hand to pat the user's ear. In FIG. 7, the user's hand 702, pats his ear 704 in a manner where his fingers 710 move, 708 to cover the In-the-Ear hearing aid 706, that resides in his ear canal 705. The input signal may also be generated when the user uses the user's finger to tap the microphone port on the device. The input signal is non-environmental input signal because it is independent of environmental input, such as music or speech. Note that the valid input switch signals do not include high frequency signals, such as ultrasound, a clicker or whistles. Because the device switch depends on the sound pressure generated by the user's hand and is not dependent on speech or other environmental inputs, the device will work well in environments of different conditions.

The device 600 may be set up so that if there is one pat on the user's ear or one tap on the device, the parameter setting Will change one way, whereas if there are two pats on the user's ear or two taps on the device, the parameter setting will change another way.

Figure 8:
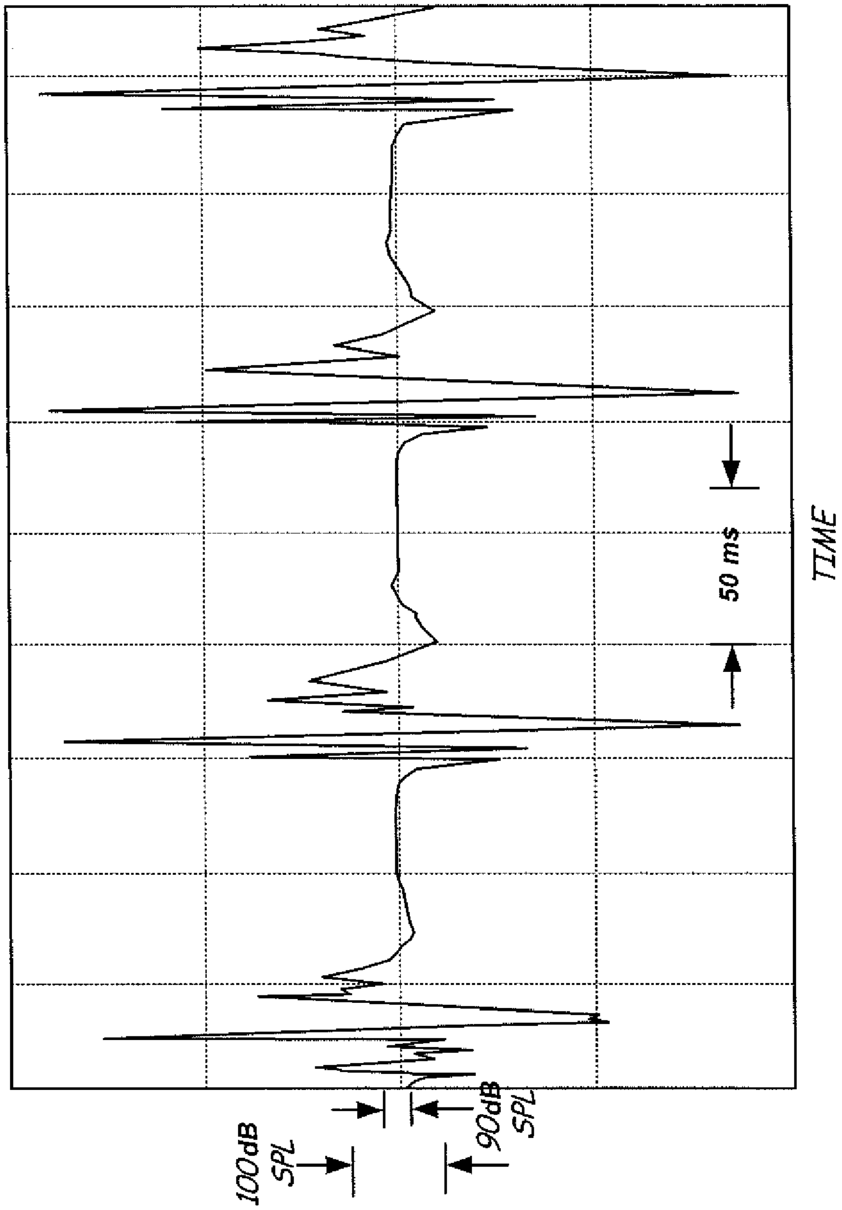
FIG. 8 is an exemplary graph illustrating the microphone response to the user patting the user's ear.

FIG. 8 is an exemplary graph illustrating the microphone response to the user patting the user's ear. As depicted in FIG. 8, the input signal generated by patting the user's ear is far above the 90 dB SPL (Sound Pressure Level) level. A normal magnitude of pressure often occurs with input signals around 65 dB SPL, whereas an abnormal magnitude of pressure occurs with input signals with amplitude around 90 dB and above. Since 90 dB is a high level input signal, it is rarely encountered in normal every day use of the device. Sound pressure levels of 95 dB SPL or higher may be used for the threshold to provide additional margin against false switches from environmental inputs. In addition to generating the high level input signal, patting the user's ear has a large low frequency component for a limited time duration, which further distinguishes the input signal generated by patting the user's ear from normal environmental input signals. Still a further safe-guard against false switching is to logically require the sound pressure level to be at a lower level, typically below 85 dB SPL during the time before and after a valid switching pressure wave.

In other embodiments, a device can adjust characteristics by changing parameter settings upon detecting both an abnormal change in an external feedback path and an input signal generated by an abnormal magnitude of pressure. This embodiment combines the detection algorithms of both of the previous embodiments. By requiring the detection of both the abnormal change in the external feedback path and the input signal generated by the abnormal magnitude of pressure, the device will be more robust and less prone to erroneous parameter setting switches.

All the embodiments of this invention perform the parameter switching normally done by a push button, without an actual physical push button. By obviating the need of a physical push button, the device size and cost can be reduced while improving reliability. Also the user actions that instigate the switching in this invention involve large hand motions. Therefore, there is not the need for fine finger dexterity that may be difficult or inconvenient.

Although the present invention has been described with reference to preferred embodiments, workers skilled in the art will recognize that changes may be made in form and detail without departing from the spirit and scope of the invention.

What is claimed is:

1. A device, comprising:

at least one microphone for receiving an input sound;

a digital signal processor connected to the microphone for producing a digital processor output signal;

a speaker for converting the digital processor output signal into output sound;

an external feedback path between the speaker and the microphone that can selectively be made abnormal by the device user;

an adaptive internal feedback cancellation system, implemented in the digital signal processor, for continually monitoring and responsively adapting to the abnormal change occurring in the external feedback path;

a detection algorithm, implemented in the digital signal processor, to detect an abnormal change in an external feedback path at least two parameter settings for adjusting characteristics of the device; and a feedback path detection switch for switching the device to a different parameter setting in response to output from the detection algorithm wherein the device is a hearing aid.

2. The device of claim 1, wherein the detection algorithm follows a logical timing sequence comprising logical steps to determine when to indicate the abnormal feedback path detection switch.

3. The device of claim 1, wherein the abnormal change in the external feedback path occurs when a user cups a user's hand over the device.

4. The device of claim 1, wherein the abnormal change in the external feedback path occurs when a user cups a user's hand over a user's ear.

5. The device of claim 1, wherein the adaptive internal feedback cancellation system comprises a finite impulse response filter.

6. A device, comprising:

at least one microphone for receiving an input signal;

a digital signal processor connected to the microphone for analyzing the input signal;

at least two parameter settings for controlling the characteristics of the device;

a pattern recognition algorithm implemented by the digital signal processor for detecting at least one input signal produced when an abnormal pressure wave is generated; and a pressure wave detection switching system for changing the at least two parameter settings in response to output from the pattern recognition algorithm wherein the device is a hearing aid.

7. The device of claim 6, wherein the abnormal pressure wave is generated when a user pats a user's ear with the user's hand.

8. The device of claim 6, wherein the abnormal pressure wave is generated when a user taps the device with the user's hand.

9. A device, comprising:

at least one microphone an input signal;

digital signal processor connected to the microphone for producing a digital processor output signal, the digital signal processor configured to implement a detection algorithm to detect an abnormal change in an external feedback path;

a speaker for converting the digital processor output signal into an output sound;

an adaptive internal feedback cancellation system for continually monitoring and responsively adapting to changes occurring in an external feedback path;

a pattern recognition algorithm implemented by the digital signal processor for detecting input signals generated when an abnormal pressure wave is generated;

at least two parameter settings for adjusting the characteristics of the device; and an abnormal feedback path detection switch for switching the device to a next available parameter setting that is responsive to both the detection algorithm and the pattern recognition algorithm wherein the device is a hearing aid.

* * * * *

UNITED STATES PATENT AND TRADEMARK OFFICE

CERTIFICATE OF CORRECTION

PATENT NO. : 8,358,797 B2
APPLICATION NO. : 12/539702
DATED : January 22, 2013
INVENTOR(S) : Robert J. Fretz It is certified that error appears in the above-identified patent and that said Letters Patent is hereby corrected as shown below:

In the Claims:

Claim 9 (originally claim 14), Column 9, Line 19: please insert --for receiving-- between "microphone" and "an"
Claim 9 (originally claim 14), Column 9, Line 20: please insert --a-- before "digital signal"

Signed and Sealed this
Thirteenth Day of August, 2013

Teresa Stanek Rea
*Acting Director of the United States Patent and Trademark Office*